United States Patent
Berkowitz et al.

(10) Patent No.: US 6,910,112 B2
(45) Date of Patent: Jun. 21, 2005

(54) SYSTEM AND METHOD FOR BACKING UP AND RESTORING DATA

(75) Inventors: Brian Berkowitz, Seattle, WA (US); David Golds, Redmond, WA (US); Michael Christopher Johnson, Bothell, WA (US); Steven E. Olsson, Camano Island, WA (US); Catharine Van Ingen, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/877,569

(22) Filed: Jun. 25, 2004

(65) Prior Publication Data

US 2004/0236916 A1 Nov. 25, 2004

Related U.S. Application Data

(63) Continuation of application No. 09/912,615, filed on Jul. 24, 2001.

(51) Int. Cl.[7] .............................................. G06F 13/00
(52) U.S. Cl. ......................... 711/162; 711/161; 714/6; 707/204
(58) Field of Search ................................ 711/161, 162; 707/204; 714/6

(56) References Cited

U.S. PATENT DOCUMENTS

| | | | | |
|---|---|---|---|---|
| 6,003,044 A | * | 12/1999 | Pongracz et al. | 707/204 |
| 6,061,770 A | * | 5/2000 | Franklin | 711/162 |
| 6,101,585 A | * | 8/2000 | Brown et al. | 711/162 |
| 6,185,663 B1 | * | 2/2001 | Burke | 711/156 |
| 6,341,341 B1 | * | 1/2002 | Grummon et al. | 711/162 |
| 6,513,051 B1 | * | 1/2003 | Bolosky et al. | 707/204 |
| 2001/0037475 A1 | * | 11/2001 | Bradshaw et al. | 714/15 |
| 2002/0078315 A1 | * | 6/2002 | Howard et al. | 711/162 |

* cited by examiner

*Primary Examiner*—Mano Padmanabhan
*Assistant Examiner*—Jasmine Song
(74) *Attorney, Agent, or Firm*—Merchant & Gould P.C.

(57) ABSTRACT

Described is a system and method for allowing applications to interact with a common backup program in a uniform way. The system and method provides a communication mechanism for one or more applications to exchange information with the backup program regarding components of the applications. The information exchanged may include an identification of the components of each application. A component may be considered a group of files or resources that should be backed up or restored together. In this way, when a backup operation is initiated, each application may provide to the common backup program instructions describing the specific components to be backed up. In addition, each application may add other application-specific information useful during a restore of the backed up data.

11 Claims, 5 Drawing Sheets

SYSTEM AND METHOD FOR BACKING UP AND RESTORING DATA

This application is a continuation of application Ser. No. 09/912,615, filed Jul. 24, 2001, which application is incorporated herein by reference.

TECHNICAL FIELD

The present invention relates to data backup systems. More particularly, the present invention relates to computing systems having data backup systems for multiple applications.

BACKGROUND OF THE INVENTION

Computer users have a need to back up their applications and data. However, until now, backing up data generally has been performed in one of two ways, each with its own problems. First, a common backup program may be used to backup all or a portion of the data stored on a storage volume, such as a hard disk, for many different installed applications. In general, the common backup program essentially copies data from the storage volume to a backup medium, such as a magnetic tape, by directories or files without regard to any particular structure that may be maintained by the applications owning the data. One problem with the common backup program is that it cannot identify whether applications have temporary or transient data which should be stored and included in the backup session. For that reason, the computer system may need to be taken offline or the applications paused or terminated to give the common backup program a quiescent or stable view of the data on the volume, which results in inefficient down time. Another problem with the common backup program is that it generally restores backed up data to exactly the same location on the volume from which the data came. Often during partial restore operations, this can result in restoring unnecessary files or data, and sometimes in overwriting good data in certain cases, such as where an application or its configuration settings have been modified and then backup data is restored over the new data.

The second type of backup system is an application-specific backup system. With this type of system, the application provides a customized backup process specific to the particular application. The application-specific backup process has the benefit of allowing the application to put itself in a quiescent state with respect to its own data and then initiate the backup operation. Since the application is presumed to have knowledge of the state and quality of its own data, the application specific backup program also has the benefit of allowing the application to identify specific groups of data or files to be backed up or excluded. However, the use of a separate backup program for each application is extremely burdensome to maintain and an inefficient use of resources. Accordingly, a need exists for an improved system and method to back up data.

SUMMARY OF THE INVENTION

Briefly stated, the present invention provides a system and method for allowing applications to interact with a common backup program in a uniform way. The invention provides a mechanism for multiple applications to exchange information with the backup program regarding components of the applications. The information exchanged may include an identification of the components of each application. A component may be considered a group of files or resources that should be backed up or restored together. In this way, when a backup operation is initiated, each application may provide to the common backup program instructions describing the specific components to be backed up. In addition, each application may add other application-specific information useful during a restore of the backed up data.

In one aspect of the invention, once a backup has been initiated, the backup program and the applications communicate through one or more communication documents. In particular, an application may create and provide to the backup program a metadata document that describes the components of the application. The metadata document includes information such as which files and resources are to be treated as a component, and may include additional information such as a special backup or restore order for particular components, or information on how the data should be restored. With that information, the backup program proceeds to create a backup document that describes which components will be backed up during the backup operation. Then, prior to the actual backup procedure, the applications are given an opportunity to review the backup document and annotate the backup document with any information that may be helpful during a restore. Finally, the backup program performs the backup procedure. The backup program may return to the backup document and set flags indicating success for each of those components successfully backed up.

On restore, the backup program may again request a metadata document from each application, or may use existing metadata documents if any exist. As mentioned above, the metadata documents may describe the components of each application and particular methods to be applied to the data during restore. Examples of particular restore methods include: restoring the data only if the data isn't already at the original location; restoring the data to the original location if any existing files can be replaced, e.g. the files aren't open; replacing existing files with the restored files at the next system reboot; and restoring the data to an alternate location.

In another aspect of the invention, the backup program may take advantage of a system resource that is capable of providing a view of a volume to be backed up in a quiescent state at a fixed point in time. For example, a "snapshot service" may be employed by the backup program to capture a steady-state view of the data stored on a volume for the purpose of performing the backup operation. In particular, the backup program may initiate a backup operation by having a snapshot taken of the operative volume. The process of taking the snapshot causes the applications having data on the operative volume to put their data in a state that is backup-friendly, such as by flushing data to disk or eliminating temporary files. In addition, by taking a snapshot of the operative volume, the backup operation can be performed without taking the system offline or disrupting users.

DETAILED DESCRIPTION OF THE INVENTION

Illustrative Operating Environment

Figure 1:
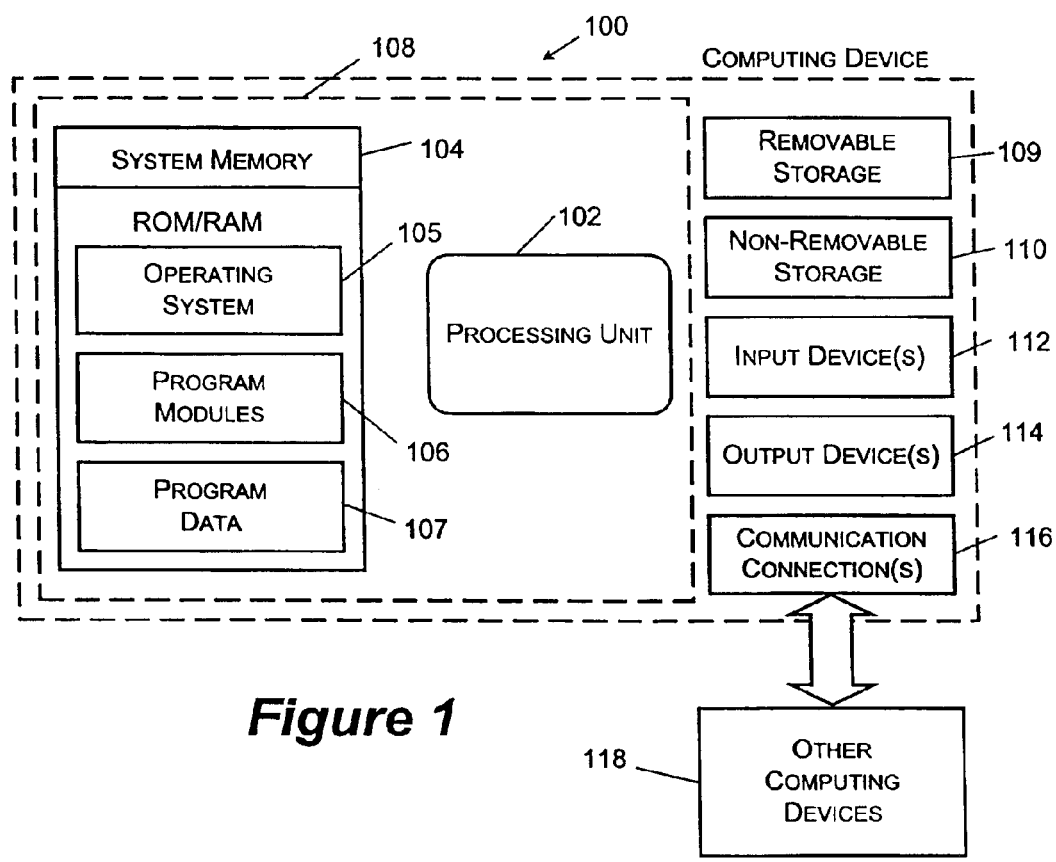
FIG. 1 is a functional block diagram of one computing device which may be adapted to implement one embodiment of the present invention.

FIG. 1 is a functional block diagram of an exemplary computing system that may be used to implement the invention. The computing system includes a computing device 100. In its most basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. All these devices are well know in the art and need not be discussed at length here.

Computing device 100 may also contain communications connection(s) 116 that allow the device to communicate with other computing devices 118, such as over a network. Communications connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
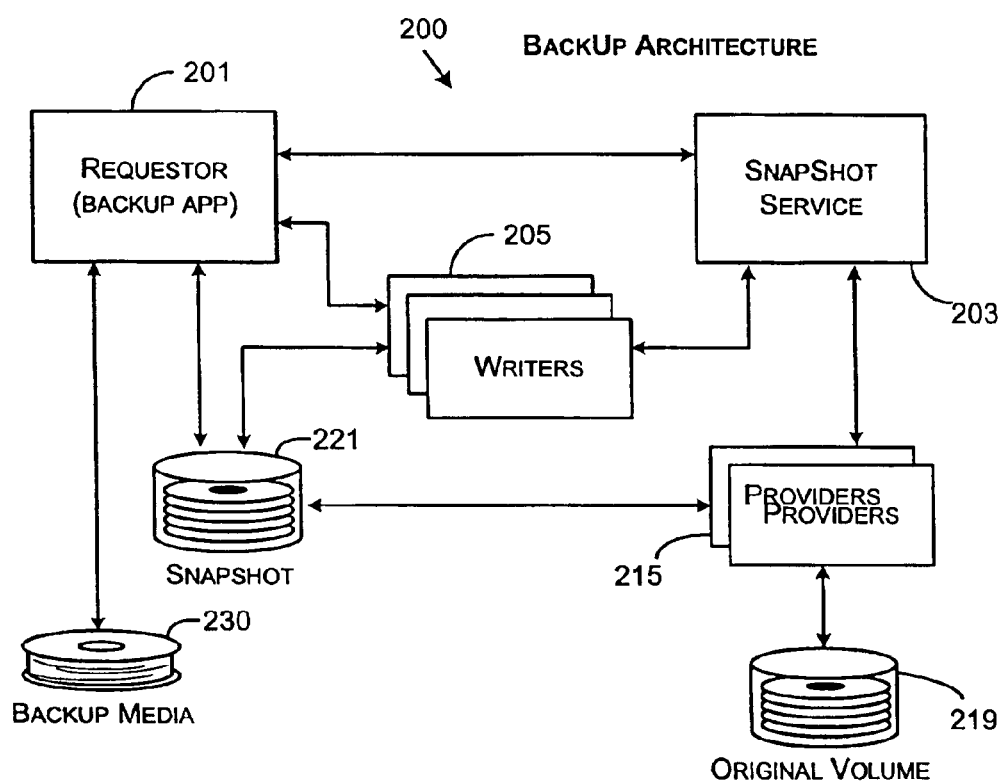
FIG. 2 is a functional block diagram generally illustrating one backup architecture that may be used to implement the present invention

FIG. 2 is a functional block diagram generally illustrating one backup architecture (system 200) that may be used to implement the present invention. Shown in FIG. 2 are a requestor 201, one or more writers 205, one or more providers 215, and a snapshot service 203. Each of those elements may communicate with each other through the well known use of interprocess communication, such as Application Programming Interfaces (APIs) or the like. The several elements shown in FIG. 2 are described here, as well as a general operational overview of the system 200. More detail on certain elements, as well as a more detailed discussion of the operational flow of the system 200 is provided later.

First, the snapshot service 203 and the providers 215 operate in conjunction to provide a snapshot capability to the system 200. The snapshot service 203 coordinates the activity associated with taking a snapshot 221 of an original volume 219. For instance, the snapshot service 203 interacts with the snapshot providers 215, the snapshot requestor 201, and applications having data writers 205 to achieve a snapshot 221 of an original volume 219. The snapshot 221 can be viewed as essentially a duplicate of a subject volume, such as the original volume 219, in a crash consistent state. The crash consistent state is defined as a state generally found on a system disk following a catastrophic failure that immediately shuts down the computer system, such as a power failure or general protection fault. The crash consistent state is generally recoverable by rebooting the machine and allowing the system to recover. All files that were open on the original volume 219 would be accessible from the snapshot 221, but not guaranteed to be in a consistent state. Files that had pending writes may have torn writes, or data may be corrupted. The operating system is generally good at recovering from the crash consistent state, but it is not the preferred state for a backup operation. Accordingly, the snapshot service 203 of this embodiment interacts with special writers 205, described more fully below, that together are able to put the system 200 in a more quiescent state prior to capturing the snapshot 221. This cooperation enables a snapshot set that is backup ready.

The providers 215 are elements of the system 200 that manage volumes, such as the original volume 219, and create the actual snapshots. One example of a provider 215 may work in conjunction with a filesystem and use a copy-on-write scheme to create a snapshot. In short, the copy-on-write scheme saves data from an old sector of the original volume 219 when new data is about to be written to the old sector. This old data is stored in a "diff area". By combining the unchanged data on the original volume 219 with the old data saved in the diff area, an image of the disk at the point in time the snapshot 221 was taken is preserved. The image can then be made available to the requestor 201 (e.g., a backup application) for the purpose of performing a backup of the original volume 219. Additional providers may also be added.

As suggested above, the requestor 201 may be a backup application or any other application or process charged with the responsibility of performing or managing a backup operation. In accordance with this embodiment of the invention, the requestor 201 is common to each application installed on the computer system. That provides the advantage that those applications are relieved of the burden of having unique backup procedures for each application. The requestor 201 may communicate with the snapshot service 203 and with one or more writers 205 (in the manner described below) during a backup operation. Briefly stated, in accordance with this embodiment of the invention, the requestor 201 gathers information from the writers 205 to define which components on the original volume 219 are to be backed up during the backup operation. The requestor 201 also works with the snapshot service 203 to create the snapshot 221 for use during the backup operation.

The writers 205 are operations, functionality, modules, or code in applications or services to support the interaction between the requestor 201, the snapshot service 203, and the applications or system services. When a system service or application is executing, the writers 205 interact with the snapshot service 203 to ensure that data is consistent on the snapshot 221. If an application or system service is not running, it is assumed that files, such as databases, associated with the application or system service are closed and consistent so that no additional effort is required by a writer 205 to perform a clean backup. Writers 205 respond to messages issued by the snapshot service 203 or the requestor 201 (e.g., a "freeze event") to allow applications to prepare for the instant at which the snapshot is taken and to ensure that no writes occur to the original volume 219 while the snapshot 221 is being created.

Figure 3:
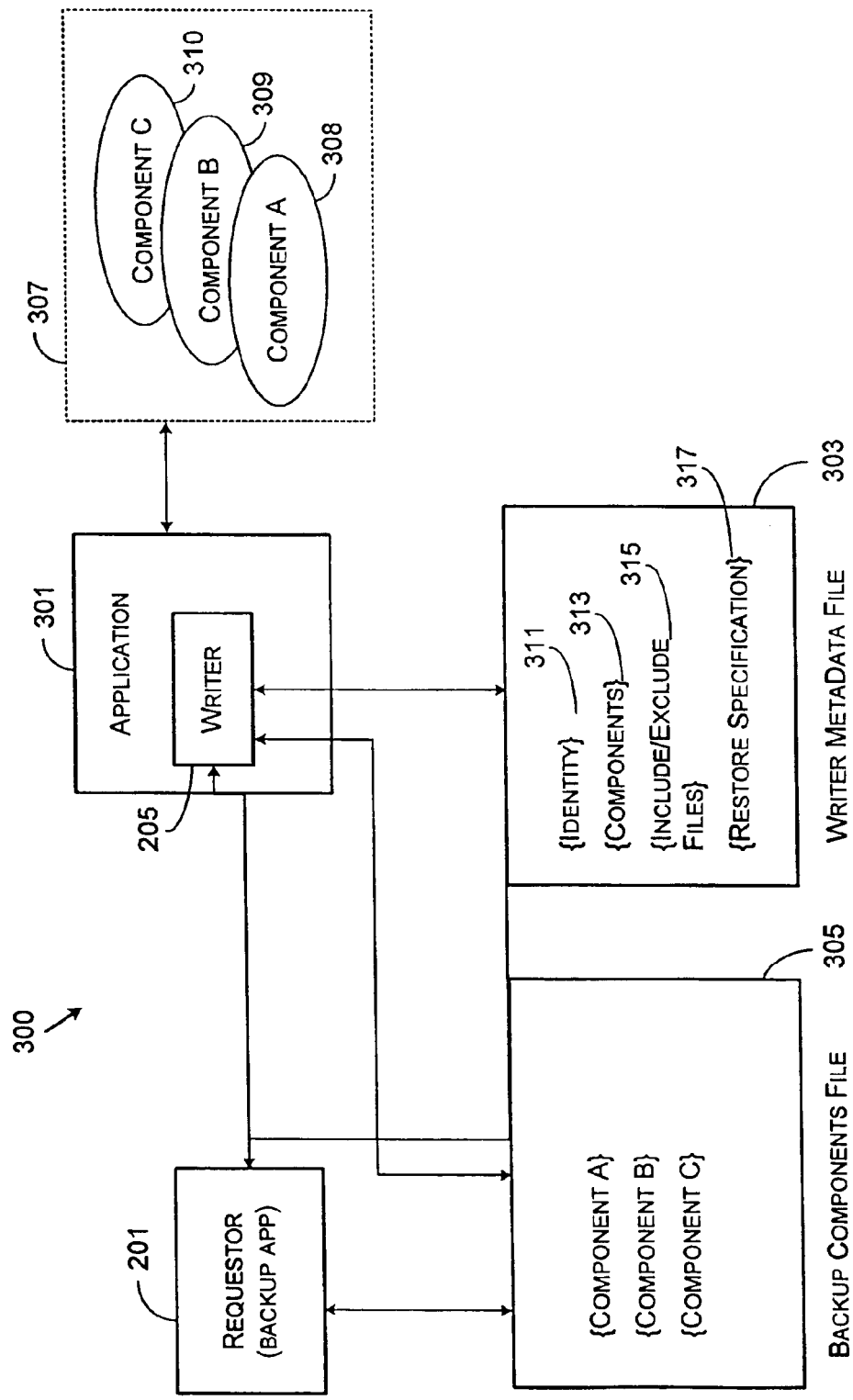
FIG. 3 is a functional block diagram adding detail to certain elements of the system depicted in FIG. 2 and including shared documents for communication between a backup application (requestor) and a writer, in accordance with one embodiment of the present invention.

In accordance with this embodiment of the invention, the writers 205 exchange information with the requestor 201 by means of one or more shared documents, such as a "writer metadata file" or a "backup components file" described below. Particular examples of the shared documents, as well as their use, are illustrated in FIG. 3 and described below. Briefly stated, the shared documents form the basis for the writer 205 and the requestor 201 to communicate with each other to help coordinate backup and restore activities. For instance, a writer metadata file may be created by the writer 205 to inform the requestor 201 of the writer's identity, how to backup data associated with the writer 205, and how to restore the data. In addition, a backup components file may be used by the requestor 201 to report back to the writer 205 what components are being backed up, the status of the backup operation and any other annotated information that may be useful to the application managed by the writer 205 after a restore operation. In short, the writer 205 communicates with the requestor 201 to provide information on the application name, icons, files, and other components to backup, any files not to backup, and on a strategy to restore the components to the disk. In this embodiment, the mechanism for that communication is the shared documents.

It is not necessary to a complete functioning of this embodiment of the invention that each application on the computing device 100 have an associated writer. However, if an application has no writer, the snapshot 221 will still be taken, and the data will exist on the snapshot 221 in whatever form it is at the instant that the snapshot 221 is created. As mentioned, this state is not always the best case because there may be inconsistent data on the volume caused by incomplete writes, data buffered in the application that are not written, or open files that are in the middle of a write operation. However, the snapshot 221 will typically contain enough information to return the data to a consistent state using some recovery scheme.

FIG. 3 is a more detailed functional block diagram of certain elements of the system 200 depicted in FIG. 2. In particular, the requestor 201 and the writer 205 are shown. The writer 205 is pictured as one module of an associated application 301. The writer 205 may alternatively be associated with a system service or other software element. FIG. 3 also illustrates examples of particular shared documents that may be employed to help achieve the benefits enabled by the present invention. More specifically, a "writer metadata" file 303 and a "backup components file 305 are illustrated. However, before describing those documents, certain terminology used in connection with this discussion should be clarified. The term "component" is used to describe a group of files or resources that are handled together as a unit during a backup or restore operation. There may be many components associated with a writer. One example is a database, which may contain several files that have little or no meaning individually. Those files may include the database itself, log files, and index files. If a complete (i.e., usable) backup of the database is to be achieved, a backup application should backup the entire group of files together as a unit.

Accordingly, the application 301 may create, modify, and generally manage one or more components, such as Component A 308, Component B 309, and Component C 310. Each of the several components may include one or more files, icons, or other resources. The set of components 307 associated with the application 301 is one example of the types of resources that may be kept on non-volatile storage subject to a backup or restore operation. Multiple applications may each have their own set of components and those shown in FIG. 3 are for illustrative purposes only.

As mentioned above, the writer 205 and the requestor 201 are able to communicate backup and restore information about the application's set of components 307 to make the backup and restore process more intelligent. In one implementation, the mechanism for that communication is one or more documents that are shared between at least the writer 205 and the requestor 201. In this implementation, those documents are the writer metadata file 303 and the backup components file 305. Those documents may be data files written in extensible Markup Language (XML) format. Alternatively, the documents themselves may actually not be passed between requestor and writer, but rather, a number of query methods could be provided to access the data represented within the documents without passing the documents themselves.

Taking first the writer metadata file 303, on notification that a backup operation has been requested (or at any other time prior to a backup operation), the writer 205 produces the writer metadata file 303 to describe the set of components 307. The writer metadata file 303 is intended to inform the requestor 201 about the writer 205, about the data that the writer 205 owns, and how that data should be restored. More specifically, the writer metadata file 303 may include such information as an identification 311 of the writer 205 or application 301, a location 313 where the files and components 307 of the application 301 exist, a specification 315 of whether and which individual files associated with the writer 205 should be explicitly excluded from or optionally included in a backup operation, and a specification 317 of what techniques should be used at restore time. Example restore techniques are described below. Once produced, the writer metadata file 303 is a read-only document to the requestor 201. One specific example of an actual writer metadata file is provided for illustrative purposes only in Appendix A of this document, and a sample schema for a writer metadata in Appendix B.

As just suggested, the writer metadata file 303 may specify 317 one or more restore techniques to be used by the requestor 201 during a restore operation. This information is but one example of a communication between the application 301 (as represented by the writer 205) and a backup application (e.g., the requestor 201) to facilitate a more intelligent backup and restore operation. The particular restore techniques specified allow the application 301 to maintain some level of control over how its components 307 are backed up and restored, without having to implement an application-specific backup application. Examples of particular restore techniques that may be specified 317 are provided in tabular format here.

TABLE 1

Sample Restore Techniques that May be Specified in the Writer Metadata File

| | |
|---|---|
| RESTORE_IF_NOT_THERE | Restore component files to disk if none of the files are on the disk already. This strategy will cause the backup application to only restore the component files that do not already exist on the disk. |
| RESTORE_IF_CAN_REPLACE | Restore files to disk if all the files can be replaced (i.e., are not opened by a service/application). This technique checks files to determine if they can be replaced to the disk. If any files cannot be replaced, no files in the component will be replaced. |
| STOP_RESTORE_START | This technique indicates that a service should be stopped prior to restoring the files. Following the restore, the service should be restarted. |
| RESTORE_TO_ALTERNATE_LOCATION | Restore files to disk in an alternate location specified by alternate location mappings as described in the writer metadata file. This allows the service to import the files as required. |
| RESTORE_AT_REBOOT | Restore files to an alternate location. Causes files to be replaced during the next reboot process. The alternate location in this case is not preset. The backup application may utilize a MoveFileEx or similar function to copy any files that are in use at the time of the restore. This is a common technique to replace the file at reboot time, such as may be included with a standard set of APIs for an operating system (e.g., the Win32 APIs). |
| CUSTOM | For use if the predefined methods will not work. The backup application must have special code to restore this type of data. This type of restore is handled by special case code outside of the writer metadata file. The restore may be accomplished using specialized APIs. |

It should be noted that, in accordance with this embodiment of the invention, if a group of files are expressed as a component, backup and restore techniques apply to every file in the component. For example, if the writer metadata file 303 expresses a component that includes three files, and the restore method is expressed as RESTORE_IF_CAN_REPLACE, the requestor 201 will not restore two of the three files if one cannot be replaced. If any of the three files cannot be replaced, the requestor 201 handles each file in the group in the same way, such as by using an alternate location mapping or failing the entire operation.

Each component identified in the writer metadata file 303 may have a different restore technique assigned. In that way, the application 301 (as represented by the writer 205) has control at a fine granularity of the particular restore techniques to be employed to almost any resource associated with the application 301. Alternatively, the writer metadata file 303 may be limited to specifying a fewer number of restore techniques (or even a single restore technique) that are applied to the components identified in the writer metadata file 303.

As an added feature, alternate location mappings may be used to specify alternate locations to restore components based on various criteria. The writer 205 may optionally specify an alternate location mapping in the writer metadata file 303. When the components are restored, the restore location is recorded in the backup components file 305 (as described later) if different from the original location of the component(s). In one example, alternate mappings may be implemented in combination with the restore techniques described above as indicated in the following table.

TABLE 2

Alternate Location Mappings for Select Restore Techniques

| | |
|---|---|
| RESTORE_TO_ALTERNATE_LOCATION | Restore to alternate location explicitly stated. |
| RESTORE_IF_CAN_REPLACE | It existing data cannot be replaced, restore the backup data to the alternate location. |
| RESTORE_IF_NOT_THERE | If the data already exists at the primary location (even though it may be replaced) use the alternate location. |

Other miscellaneous information helpful to the application 301 may also be specified in the writer metadata file 303. For example, to have a notification issue in response to a complete backup operation or a restore operation, the writer 205 may specify that OnBackupComplete method or OnRestore method be called in the writer metadata file 303. Likewise, to cause a reboot following the restore of data, the writer can include such a specification in the writer metadata file 303.

Next, the backup components file 305 provides a mechanism for the requestor 201 to communicate with the application 301 (via the writer 205). The backup components file 305 is initially produced by the requestor 201 during a backup operation and describes what is being backed up. More specifically, the backup components file 305 includes an indicator of each component that will be backed up and any additional information that will be useful at restore time for those components. Unlike the writer metadata file 303, which is read-only, the backup components file 305 may be changed by the requestor 201 or the writer 205 prior to or during the backup operation. There are various ways to "annotate" the backup components file 305 to facilitate the backup and restore processes. The backup components file 305 is available for the writer 205 to examine during a restore operation so that the writer 205 may take appropriate actions following a restore.

The Backup Components file may specify whether bootable system state or system services are backed up. It may specify whether the backup is full, incremental, differential. For each component it may specify alternate location mappings where a file is restored if the file is restored to a different location than the original. For each component, it may specify if the component was successfully backed up. In addition, it may specify whether the requestor is doing component by component backup (in which the backup components file contains the components being backed up) or is backing up entire volumes (in which case the backup components file does not contain the components being backed up and the writer must assume that any data that it has on a volume being included in the snapshot is included in the backup). A sample of one actual backup components file appears in Appendix C of this document, and a sample of a backup components file schema appears in Appendix D of this document.

Figure 4:
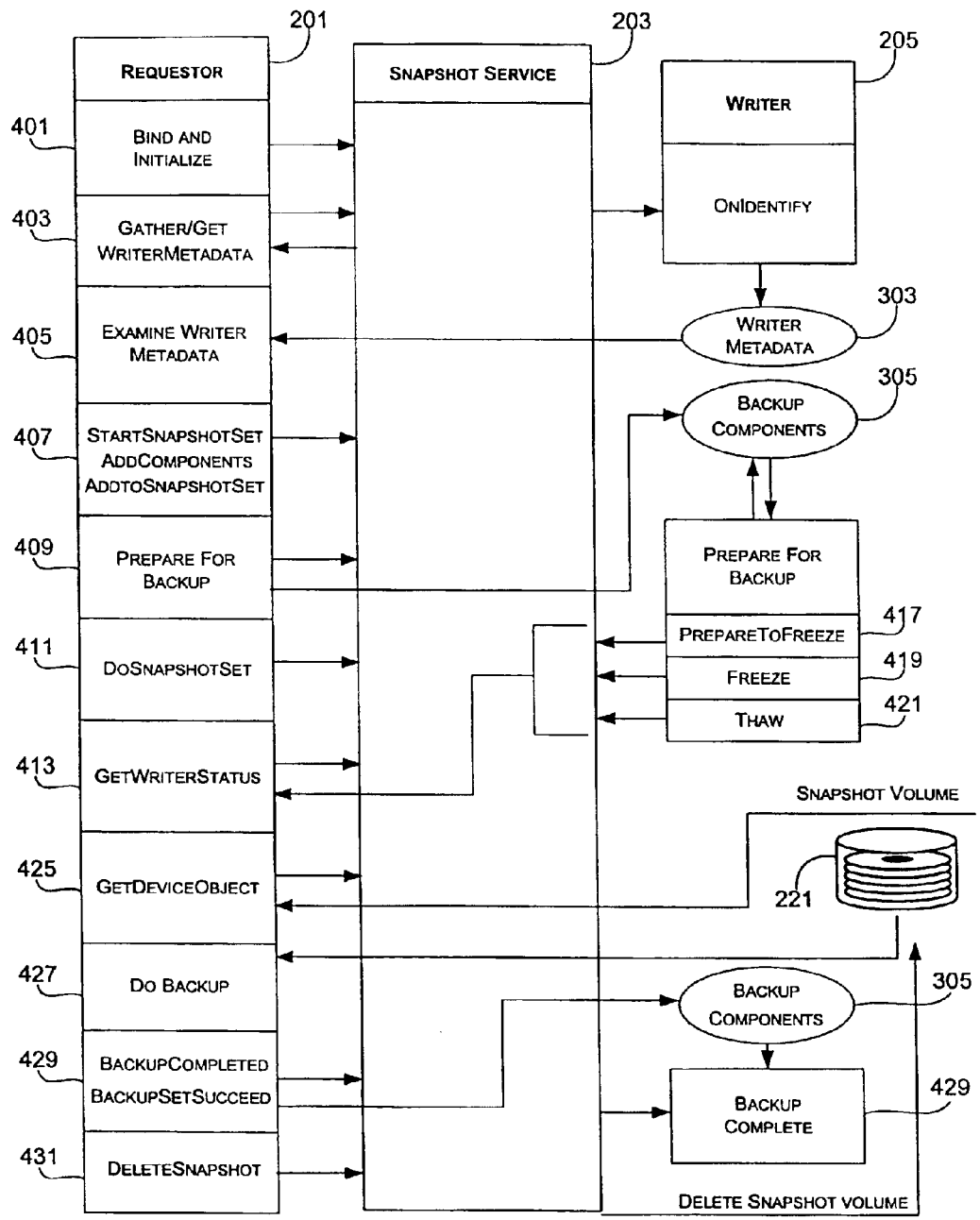
FIG. 4 is an instruction flow diagram illustrating the flow of instructions between various elements of an exemplary system implementing the invention during a backup operation.

To help understand the dynamics and interaction of the system 200, and the advantages realized through the use of the shared documents described above, an overview of processing performed by the system 200 is helpful. FIG. 4 is an instruction flow diagram illustrating the flow of instructions between various elements of the system 200 during a backup operation. In particular, the flow of instructions between the requestor 201, the snapshot service 203, and the writer 205 is shown to illustrate a typical backup operation enabled by the teachings of the present invention. Processing (time) flows downward in the figure. To begin, the requestor 201 binds to an interface of the snapshot service 203 in a bind and initialize phase 401, in preparation of the backup operation. An InitializeForBackup method may be used to initialize the backup components file 305 to communicate information to the writer(s) 205. A SetBackupState method may be used to indicate if the backup is for data volumes, bootable system state, or system services. Other information may additionally be provided, such as whether the backup is intended to be a full, incremental, differential, or other type of backup.

During an enumerate writer metadata phase 403, the requestor 201 identifies the writers 205, such as through the use of a GatherWriterMetadata call to the snapshot service 203, which prompts the snapshot service 203 to issue an OnIdentify call to the writer 205. In response, the writer 205 prepares the writer metadata file 303 (as described above) to define the components associated with the writer 205 for backup. The writer 205 then makes the writer metadata file 303 available to the requestor 201, and the snapshot service 203 returns a GetWriterMetadata call to the requestor 201. The enumerate writer metadata phase 403 is a discovery phase of the backup operation where the requestor 201 retrieves from the writer 205 its metadata. Once the requestor 201 has acquired metadata from each of the writers 205, it proceeds to the examine writer metadata phase 405.

During an examine writer metadata phase 405, information is extracted from the writer metadata file 303 by the requestor 201 to facilitate the backup operation. Using the writer metadata, the requestor 201 may determine what applications are currently executing and what volumes to snapshot in order to get a complete backup. From the writer metadata, the requestor 201 determines the volumes that need to be snapshot to ensure appropriate coverage of the components specified for backup. For example, if the requestor 201 attempts to backup bootable system state, and the writer 205 indicates that the bootable system state is contained on the boot and system volumes, then the requestor 201 would understand to snapshot those volumes in order to back them up. In addition, the requester 201 should identify from the writer metadata file 303 which components (or which files) should be copied to achieve proper coverage of the application or service being backed up. Moreover, the requestor 201 may identify individual files that are to be explicitly excluded from the backup for an appropriate backup to be completed. In this way, the requestor 201 ascertains the information listed above from the writer metadata file 303 (or files, if multiple writers 205 are involved) in preparation to initiate a snapshot sequence. The requestor 201 may call a FreeWriterMetadata method when it is done accessing the metadata to deallocate any state that may be retained as a result of the GatherWriterMetadata method.

At this point, the requestor 201 has identified the volumes to snapshot. The requester 201 begins preparing to create the snapshot 221 at a start snapshot phase 407. During this phase 407, the requestor 201 communicates to the snapshot service 203 which volume is the first to start the set of volumes required for the backup operation. Any additional components to be backed up may also be added to the backup components file 305 at this time. Volumes maybe added to the snapshot set until the required volumes are included.

During a prepare for backup phase 409, the requestor 201 adds information to the backup components file 305 and makes it available to the writer 205. In this way, the requestor 201 notifies the writer 205 of the snapshot is commencing. As discussed above, the backup components file 305 communicates to the writer 205 the backup plan of the requester 201. The writer 205 may annotate the backup components file 305 with restore information at this time. The requestor 201 may also call a GetWriterStatus method to determine whether the writer 205 has succeeded in the prepare for backup phase 409.

An initiate snapshot phase 411 is the initial stage of the creation of the snapshot 221. At this point, the requestor 201 may idle and await the creation of the snapshot 221 by the snapshot service 203. The snapshot service 203 performs the snapshot operation in essentially three stages: (1) a PrepareForFreeze phase, during which the various writers put themselves in a state where they can quickly freeze (e.g., flush buffers, create a checkpoint, and the like), (2) a Freeze phase, during which each of the processes stop writing to disk, and (3) a Thaw phase, where writers may resume writing to disk. The several writers 205 may cooperate with the snapshot service 203 during the three stages of the snapshot operation.

When the snapshot operation is complete, in a get status phase 413, the requestor 201 may query the writer 205 for success or failure. A snapshot may fail for a variety of reasons. Some may be severe enough for the requestor 201 to abort the snapshot operation and try again later. Some failures may be recoverable. The requestor 201 determines the appropriate course of action based on information received from the writer 205 and the type of backup that is being attempted. For example, a writer failure may be ignored if the data the writer is supplying does not need to be backed up. Note that just because a writer fails during a snapshot, the snapshot itself does not fail, it is really just a writer failure for the snapshot.

The requestor 201 retrieves the snapshot 221 at a get device object phase 425, such as through the use of a GetDeviceObject method. The response to the GetDeviceObject method may be in the form of a path to the snapshot 221, such as "\device\harddiskvolume." That path can be prepended to the path of a file stored on the original volume 219 to open the corresponding file on the snapshot 221. The requestor 201 is now prepared to perform the backup operation.

The requestor 201, at the backup phase 427, moves data from the snapshot 221 to backup media 230 (FIG. 2) in the conventional manner, such as by using the APIs that are currently used to perform backup operations. The snapshot 221 appears to the requestor 201 as read-only, and the files on the snapshot 221 appear to be closed. For those reasons, the backup operation results in backup data that is more easily restored since the applications with writers, such as application 301, are actually involved in the backup operation and can put their components in a quiescent state prior to the backup operation. In addition, throughout the backup phase 427 or at its end, the requestor 201 may make modifications to the backup components file 305 to indicate the success or failure of backing up each component.

When the backup operation has completed, the requestor 201 enters the backup complete phase 429. In this phase 429, the requestor 201 may pass the backup components file 305 back to the writer 205 to indicate the information that was successfully backed up. The backup complete phase 429 allows applications or writers to cleanup state that is no longer needed once they know that the data has been backed up. For example, many database systems truncate logs once the data contained in those logs is backed up. To elaborate, some applications may annotate the backup components file 305 with particular information that facilitates restoring the data (for example a database might include checkpoint information in the metadata). After the files are placed on disk during the restore operation (described later), the writer is notified of the restore and can do appropriate post-processing based on data in the backup components file 305, including the annotations it made during backup.

It should be noted that the backup components file 305, at this point, is assumed to have already been placed on the media 230. For that reason, it may now be read-only. The writer 205 has an opportunity to note the components that have been backed up and take any appropriate action the writer 205 deems necessary. Finally, at a delete snapshot phase 431, the backup operation is complete and-the snapshot 221 maybe destroyed.

The above instruction flow diagram illustrates the flow of instructions that occurs in the system 200 during a backup operation. It should be appreciated from the instruction flow diagram that the shared documents, e.g., the writer metadata file 303 and the backup components file 305, allow the requestor 201 and the application 301 (via the writer 205) to communicate when performing the backup operation. What follows is an instruction flow diagram illustrating the flow of instructions that occurs during a restore operation.

Figure 5:
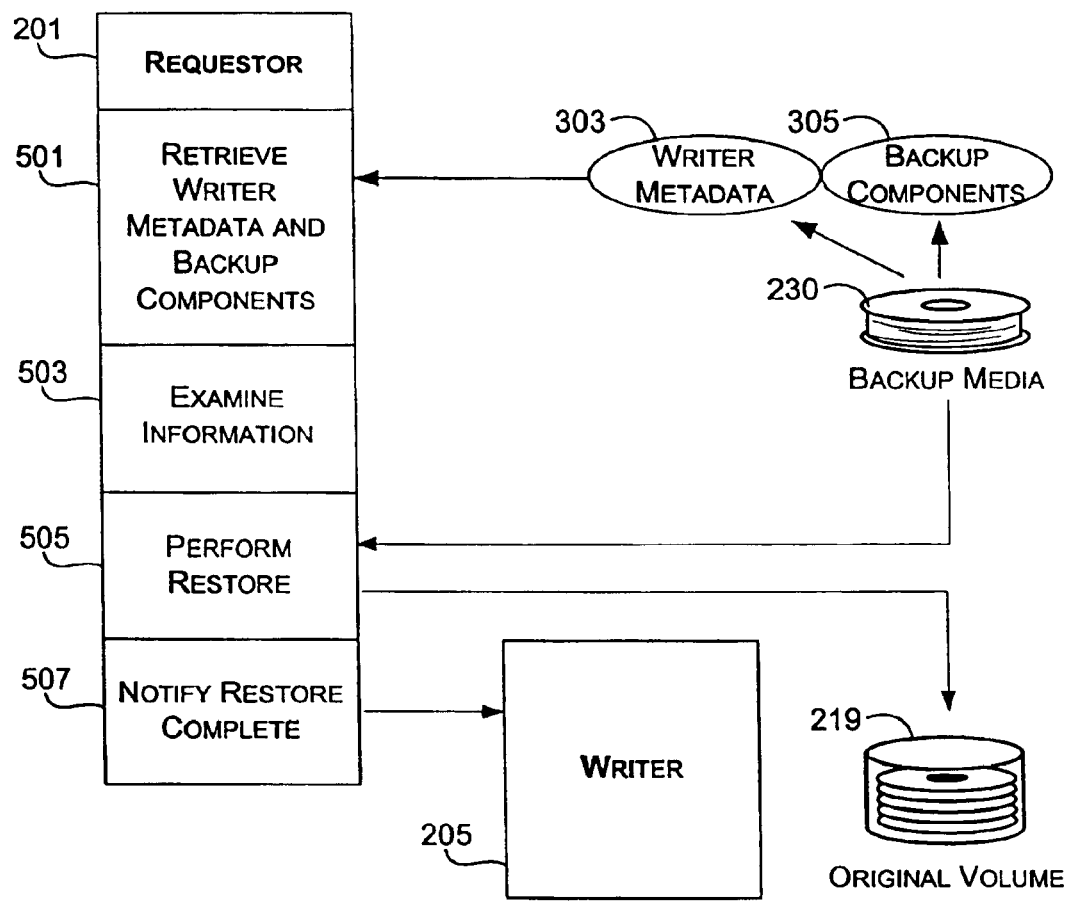
FIG. 5 is an instruction flow diagram illustrating the flow of instructions that occurs in an exemplary system implementing the invention during a restore operation of data backed up in accordance with the embodiment of the invention illustrated in FIG. 4.

FIG. 5 is an instruction flow diagram illustrating the flow of instructions that occurs in the system 200 during a restore operation of data backed up in accordance with the methods and procedures described above. The restore operation involves the cooperation of a writer 205 and a requestor 201 (again, such as a backup application). The general concepts described here may also be applied to multiple writers and additional files or components that were backed up without the aid of a writer.

To begin, at phase 501, the requestor 201 retrieves the writer metadata file 303 and the backup components file 305 from the backup medium 230. As discussed above, the writer metadata file 303 includes information that describes the writer 205, the components of the application 301 associated with the writer 205, and any special restore techniques that may be applied during this restore operation. The backup components file 305 describes the components (and possibly individual files) that were actually backed up. Accordingly, the requestor 201 retrieves that information, and then, at an examine writer metadata phase 503, examines the metadata. This allows the requestor 201 to determine what components were backed up, what files were backed up, and any special restore techniques to apply. The writer metadata file 303 and the backup components file 305 may be examined using methods described in the previous section, to determine things such as what is the restore method? what are the components? is an alternate location mapping specified? what are the files that were backed up? did the writer 205 request an OnRestore method? and the like. Each of these inquiries may be answered during the examine writer metadata phase 503 with reference to the writer metadata file 303 and the backup components file 305.

At this point, the requestor 201 is prepared to restore the data stored on the backup media 230 to the original volume 219. Thus, the requestor 201 begins the process of copying the information from the backup media 230 to the original volume 219 in accordance with any particular restore techniques or instructions specified in the writer metadata file 303. The writer metadata file 303 may indicate to the requestor 201 how the data is to be restored on a component-by-component basis. Thus, at the perform restore phase 505, the requestor 201 restores each component using the indicated method as described earlier in this document. Should the requestor 201 be forced to place files in an alternate location mapping, those alternate locations are also provided in the backup components file 305. If an alternate location is used by the requestor 201, it may call an AddAlternativeLocationMapping method to indicate which files were relocated and where they were relocated. This information will then be accessible to the writer 205 at the conclusion of the restore operation. The backup components file 305 may also be passed to the writer as part of an OnRestore operation When the data is completely restored, at a notify restore complete phase 507, the requestor 201 may notify the writer 205 that the restore operation is complete. In this way, the writer 205 may perform any post-processing on the resources that are restored, as described above. In addition, the requestor 201 may then determine if any of the writers requires an OnRestore method by again examining the writer metadata file 303. If so, the backup application can issue one. Once these functions have completed, the restore operation is complete.

The above specification, examples and data provide a complete description of the manufacture and use of the invention. Since many embodiments can be made without departing from the spirit and scope of the invention, the invention resides in the claims hereinafter appended.

We claim:

1. A computer-readable medium having computer-executable components, comprising:
    a writer configured to create a writer metadata file, the writer being associated with a plurality of components stored on a volume of a computing system, the writer metadata file including an identifier of the writer and a description of which of the plurality of components are to be included in a backup operation of the volume;
    a requestor configured to read the writer metadata file to identify the components to be included in the backup operation and to interface with a service configured to create an image of the volume at an instant in time, the requestor being further configured to backup the identified components from the image of the volume to a backup medium.

2. The computer-readable medium of claim 1, wherein the requester is further configured to create a backup components file describing a set of components that are to be included in a backup operation managed by the requestor, and wherein the requestor is further configured to provide the backup components file to the writer for modification.

3. The computer-readable medium of claim 1, wherein the writer metadata file further comprises a listing of files within the plurality of components that are intended to be excluded from the backup operation of the volume.

4. The computer-readable medium of claim 1, wherein the writer metadata file further comprises an identification of a restore technique to be applied to the backed up components during a restore operation.

5. The computer-readable medium of claim 4, wherein the restore technique comprises restoring the backed up components if those components are not already at a restore location for the components.

6. The computer-readable medium of claim 4, wherein the restore technique comprises replacing components already at a restore location with the backed up components if those components can be replaced.

7. The computer-readable medium of claim 4, wherein the restore technique comprises stopping a service prior to restoring the backed up components.

8. The computer-readable medium of claim 7, wherein the restore technique further comprises restarting the service after restoring the backed up components.

9. The computer-readable medium of claim 4, wherein the restore technique comprises restoring the backed up components to a location other than the location from which the components were backed up.

10. The computer-readable medium of claim 4, wherein the restore technique comprises causing the backed up components to be restored during a subsequent system reboot.

11. The computer-readable medium of claim 4, wherein the requestor is further configured to perform a restore operation of the backed up components by applying the restore technique to the backed up components during the restore operation.

* * * * *